United States Patent [19]

Melen

[11] Patent Number: 5,046,116
[45] Date of Patent: Sep. 3, 1991

[54] SYMBOL ANALYZING SYSTEM AND METHOD WITH DATA EXCLUSION AND CONFIDENCE FACTORS

[75] Inventor: Roger D. Melen, Los Altos Hills, Calif.

[73] Assignee: Canon Research Center America, Inc., Palo Alto, Calif.

[21] Appl. No.: 627,336

[22] Filed: Dec. 14, 1990

[51] Int. Cl.$^5$ .............................................. G06K 9/62
[52] U.S. Cl. ....................................... 382/36; 382/43; 382/39; 364/726
[58] Field of Search .................... 382/43, 36, 39; 364/726; 358/432, 463

[56] References Cited

U.S. PATENT DOCUMENTS

| | | | |
|---|---|---|---|
| 4,674,125 | 6/1987 | Carlson et al. | 382/49 |
| 4,764,973 | 8/1988 | O'Hair | 382/14 |
| 4,843,631 | 6/1981 | Steinpichler et al. | 382/43 |

*Primary Examiner*—Leo H. Boudreau
*Assistant Examiner*—Steven Klocinski
*Attorney, Agent, or Firm*—Paul Hentzel

[57] ABSTRACT

A symbol analyzing system processes spectral power data of an input test symbol for deriving line width and line count information about the symbol, and for generating a reliability confidence for each line count. An excellent controller progressively reduces the spectral power by progressively excluding a larger portion of the upper frequency end of the power spectrum. The excluded power levels are compared to a set of predetermined reference power levels from an ideal reference symbol. Each excluded power level that compares with a reference level is matched with reference coefficients Kw and Kc for that reference level. Each matched excluded power level has a remaining non-excluded power level Pbw in the non-excluded bandwidth BW at the lower end of the frequency spectrum. These included power levels and bandwidths are matched with the reference coefficients. The line width LW and line count LC of the input test symbol are calculated based on the included power levels Pbw, the included bandwidth BW, and the coefficients Kw and Kc.

42 Claims, 3 Drawing Sheets

SYMBOL ANALYZING SYSTEM AND METHOD WITH DATA EXCLUSION AND CONFIDENCE FACTORS

TECHNICAL FIELD

This invention relates to symbol analyzing systems used in character recognition, and more particularly to symbol analyzing systems which produce character confidence factors generated by a multiple analyzing sequences based on progressively excluded data.

BACKGROUND

Heretofore symbol recognition systems processed all of the data presented without data exclusion, and the character was either recognized or not recognized. The recognition sequence was a single processing step in which the input symbol data was compared with a reference library of possible symbols. The result of the comparison was either pass or fail without any provision for reliability weighting with confidence factors. U.S. Pat. No. 4,817,176 issued Mar. 28, 1989 to Marshall et al, discloses such a prior art pattern recognition technique.

SUMMARY

It is therefore an object of this invention to provide an improved symbol analyzing system for deriving feature information about the input symbols.

It is another object of this invention to provide such a symbol analyzing system which provides a confidence factor indicating the reliability of the feature information.

It is a further object of this invention to provide such a symbol analyzing system in which the input symbol data is progressively excluded to provide a set of line feature entries.

It is a further object of this invention to provide such a symbol analyzing system in which the set of line feature entries is merged into a single composite entry.

It is a further object of this invention to provide such a symbol analyzing system in which the set of line feature entries is merged into a standard deviation entry.

Briefly, these and other objects of the present invention are accomplished by providing a symbol analysis system which receives and processes symbol data. The system derives feature information concerning the symbols represented by the symbol data, and generates a confidence factor indicating the reliability of the derived symbol feature information. A digitizer receives an input document containing the symbol data and provides an input bit stream. A document memory receives and stores the input bit stream in a bit map of the input document. A retrieval controller identifies symbol bit maps for selected symbols within the document bit map, and systematically addresses the selected bit maps along retrieval passes to provide bit streams of symbol data. A spectral transform device transforms the bit streams of symbol data into a spectral response having a lower frequency end and an upper frequency end. A data exclusion controller receives the spectral response and provides a set of symbol feature information entries based on progressively reducing the bandwidth of the spectral response by excluding a progressively larger portion of the upper frequency end. An entry processor receives the set of symbol feature information entries and forms a single composite entry for the symbol feature with a confidence factor indicating the reliability of the composite entry.

BRIEF DESCRIPTION OF THE DRAWING

Further objects and advantages of the present symbol analyzing system and the operation of the data exclusion sequence will become apparent from the following detailed description and drawing in which.

GENERAL EMBODIMENT-BLOCK DIAGRAM (FIG. 1)

Figure 1:
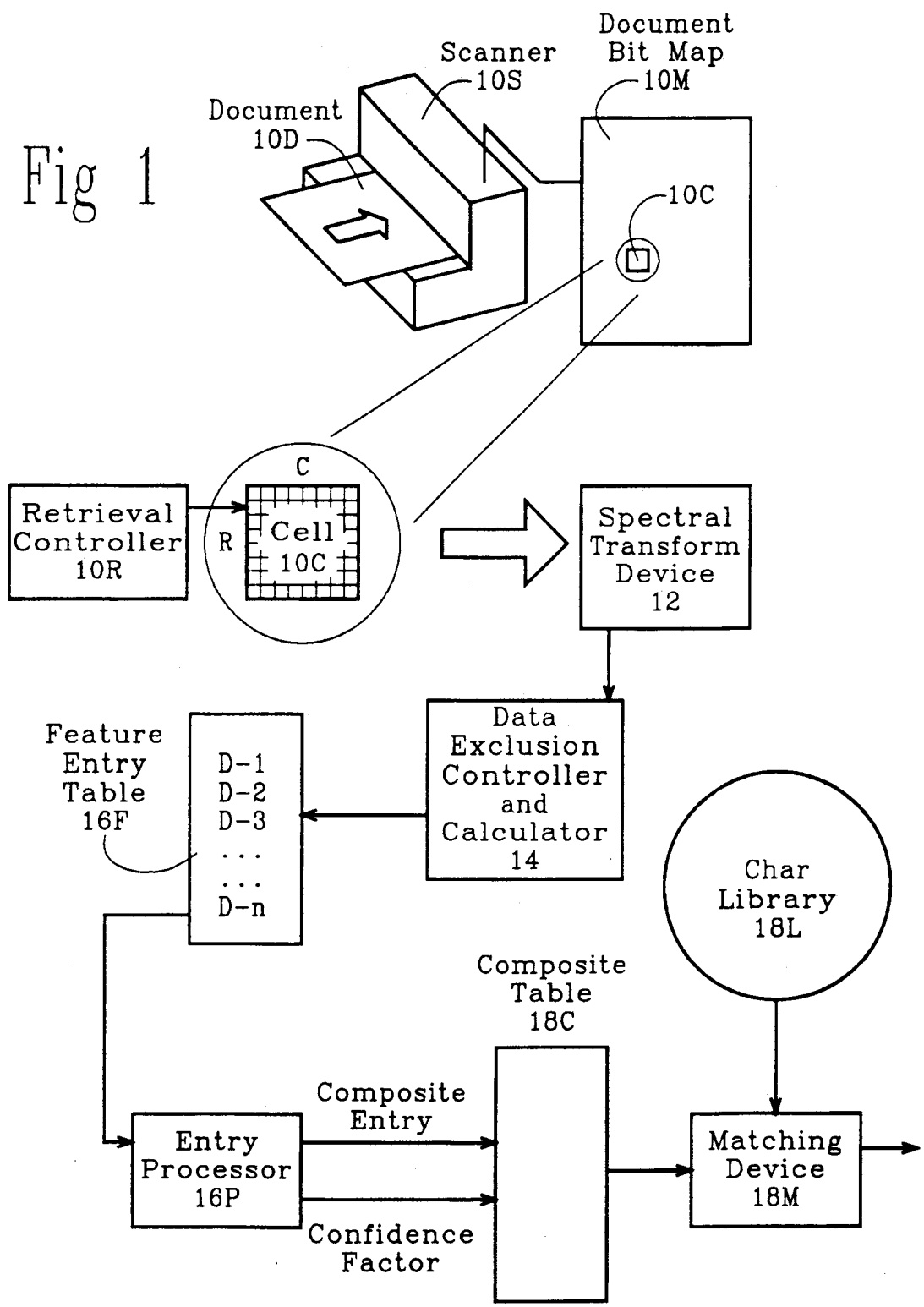
FIG. 1 is a block diagram of a symbol analyzing system showing the data exclusion feature.
Figure 2:
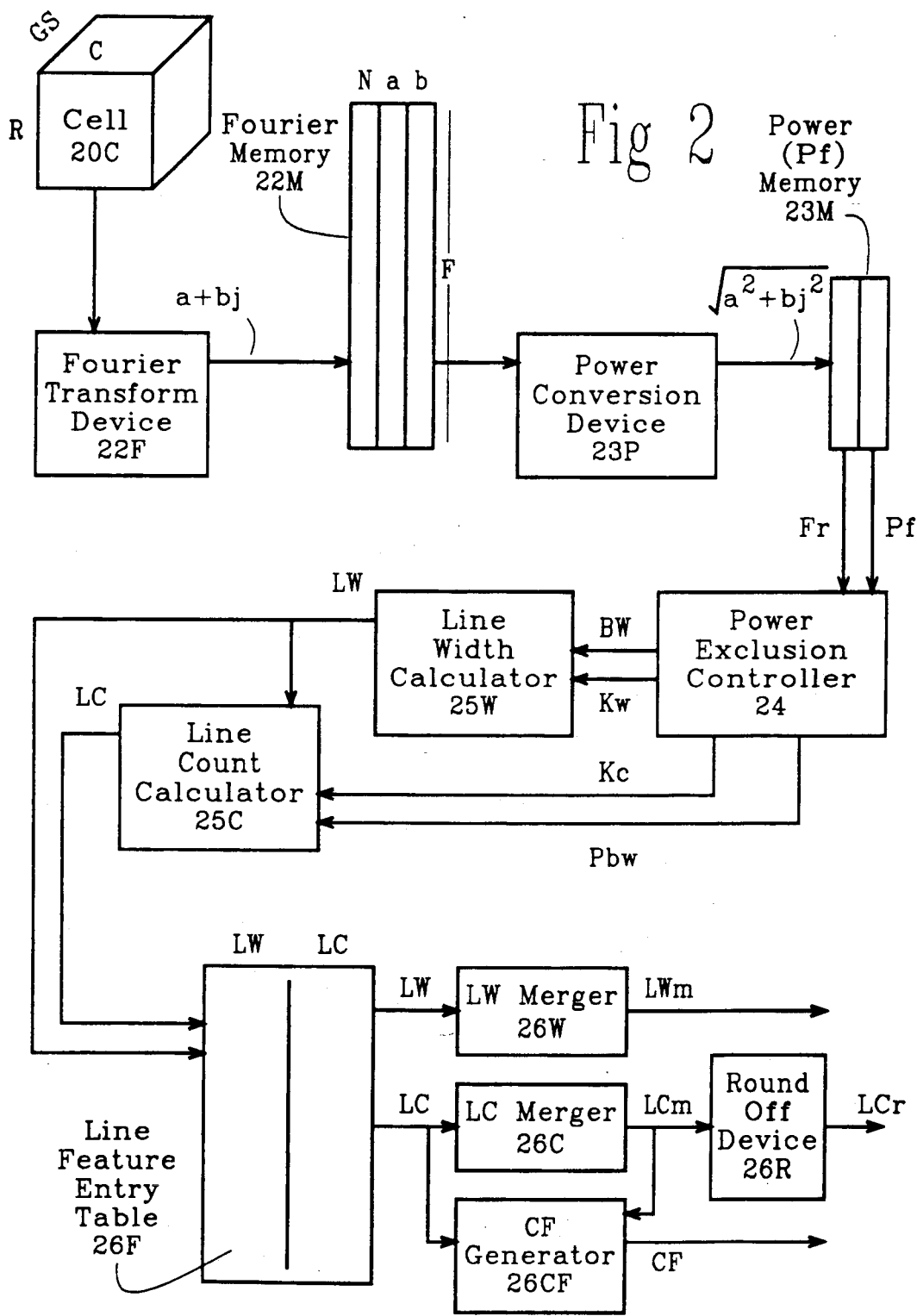
FIG. 2 is a block diagram of the data exclusion and feature calculation portion of a symbol analyzing system.

Optically visible symbols printed or otherwise embodied on a tangible medium such as document 10D are digitized by a suitable reading device such as optical scanner 10S, and stored in memory 10M as a document bit map. Preferably the document to be digitized is uniformly illuminated by a scanning light source for providing reflected light which is intensity modulated by the presence and absence of the lines forming each symbol. In this disclosure, the term "lines" shall mean the linear and/or curved strokes or graphic elements forming the symbol including elements that extend horizontally, vertically and at various angles. The modulated reflected light is detected by a suitable photo-sensitive device such as an array of photodiodes which provide a stream of diode pulses to the document bit map. For maximum line position resolution, there is a pixel stored in the bit map for each diode pulse.

Retrieval controller 10R identifies bit maps for individual test symbols (character cells 10C) within the document bit map using segmentation techniques based on the continuous blank background region between successive lines of text and separating adjacent symbols. The bits within the "test" cell selected for analysis are retrieved by data passes along cell rows "R" and/or cell columns "C" by the retrieval controller. The each row generally corresponds to a horizontal pass across the symbol, and each column generally corresponds to a vertical pass across the symbol.

The retrieval controller systematically addresses the cell memory, forming a binary bit stream of "1"s and "0"s. Each edge boundary between symbol are and background region within the test symbol bit map causes a corresponding edge transition in the bit stream. The leading edge of each symbol area in each retrieval pass changes the binary state of the bit stream from the background region state to the symbol area state. The trailing edges change the binary state back to the background state.

In a conventional white document with black print, the white background region from the margin of the cell to the edge of the symbol is one binary state ("0" for example). The black symbol area between the leading edge and the trailing edge of each symbol area is the other binary state ("1" for example).

Spectral transform device 12 transforms the bit stream of each cell retrieval pass across the test symbol 10 into a spectrum response of amplitude verses frequency containing symbol feature information such as line width "LW" and line count "LC". The transform employed by spectral transform device may be any suitable mathematical transform such as a Fourier transform, a Hadamard transform, a Karhunen-Loeve, a sine transform, a cosine transform, and Haar transform, and others. Further information concerning suitable mathematical transforms may be found in the text "Application of Digital Processing", section 4.3, written by Alen V. Oppenheim (of MIT), and published by Prentice-Hall, Inc; or in the text "Digital Picture Processing", 2nd edition Volume 1, section 5.3, written by Azriel Rosenfeld (of University or Md) and Avinash C. Kak (of Purdue), and published by Academic Press Inc.

The spectral response of the retrieval pass currently being retrieved is processed by data exclusion controller and calculator 14. The resulting feature information is entered into the first location of feature entry table 16F as D-1. The spectral response is then reduced by a predetermined data increment producing modified feature information which is entered into the second location of the feature entry table as D-2. The response is reduced by another increment and entered into the third location. Each cycle of the data exclusion sequence generates a feature information entry by progressively reducing the bandwidth "BW" of the spectral response with corresponding exclusion of a progressively larger portion of the upper frequency end of the spectral response. The data exclusion sequence is terminated at the nth data level (the nth cycle) and the last retrieval pass is entered into the nth location. At the end of the data exclusion sequence, feature entry table 16F contains a set of N entries for a the current row or column retrieval pass of cell 10C.

Entry Processor 16P statistically treats the N data exclusion entries generated by the N exclusion cycles, using mathematical techniques to merge them into a single composite entry for the current retrieval pass from character cell 10C. The processor then generates an accompanying confidence factor for the current composite entry. The next retrieval pass from cell 10C is transformed by spectral transform device 12 into a spectral response, which produces the next N entries and the next composite entry. The composite entry and confidence factor of each pass of the R rows and C columns are entered into composite table 18C for further processing by suitable matching device 18M against a library of reference symbols contained in library memory 18L.

The library contains predetermined feature information such as LWs and LCs for reference symbols in an ideal reference font derived from data retrieval passes across the rows and columns of a pre-existing bit map of each reference symbol. The matching device may be a suitable LW and LC comparing system such as a set of matched filters or a neural algorithm matching network. The reference LW and LC feature information for each reference symbol is pre-entered into the matched filters, and the test LW and LC feature information for each test symbol is advanced through the filters. U.S. Pat. No. 4,817,176 issued Mar. 28, 1989 to Marshall et al, shows a Fourier spectrum approach in which the input data is compared with standard known characters to obtain a "best match". The Marshall patent is hereby incorporated by reference in its entirety into this disclosure.

POWER EXCLUSION EMBODIMENT—(FIG. 2)

Cell memory 20C containing a bit map of the test symbol selected for analysis provides a bit stream into Fourier transform device 22F for each retrieval pass of the rows and columns in memory 20C. The bit stream includes greyscale data GS for preserving the intensity characteristics of the original document such as black/white contrast and tonal shades. The output of the Fourier transform device is a series of complex numbers $(a + bj)$; one number for each frequency. Each number has a real component "a" containing the line width (LW) and line count (LC) information, and an imaginary component "bj" containing the line position information. The series of "a" and "b" values are store in Fourier memory 22M along with the retrieval pass number "N" of the row or column. The format of the Fourier transformation provides a Fourier frequency and memory location for each bit in the row or column of the current retrieval pass. The number of locations "F" generated by the Fourier transformation is a power of two ($F = 2^n$), and may exceed the number of bits retrieved. The second half of the Fourier spectrum is a redundant mirror image of the first half. The number of usable or non-redundant frequencies in the Fourier spectral response is therefore $F/2$, extending from Fl up to Fmax.

Power conversion device 23P converts the series of "F" complex numbers in the Fourier response of the current retrieval pass into a corresponding series of real numbers "Pf" of a power spectral response extending from F1 up to Fmax (see FIG. 3B) in accordance with the relationship:

$$\text{Power} = \sqrt{\text{Fourier}^2}$$

$$Pf = \sqrt{a^2 + bj^2}$$

in which
  Pf is the power contained in the power spectral response at a particular frequency.

The resulting F/2 real Pf numbers are stored in power memory 23M.

Power exclusion controller 24 reduces the power spectral response of the current retrieval pass to an optimum initial level by eliminating frequencies of the power spectrum starting with the highest frequency Fmax. The initial power reduction eliminates the high frequency portion from Fmax down to Fi (see FIG. 3B) which contains low amplitude, high frequency noise caused by non-symbol system artifacts such as tiny ink spots, dust and sensor apparitions. The LW and LC feature information is contained in the low frequency portion of the spectral response and is not affected by this initial power exclusion.

Figure 3A:
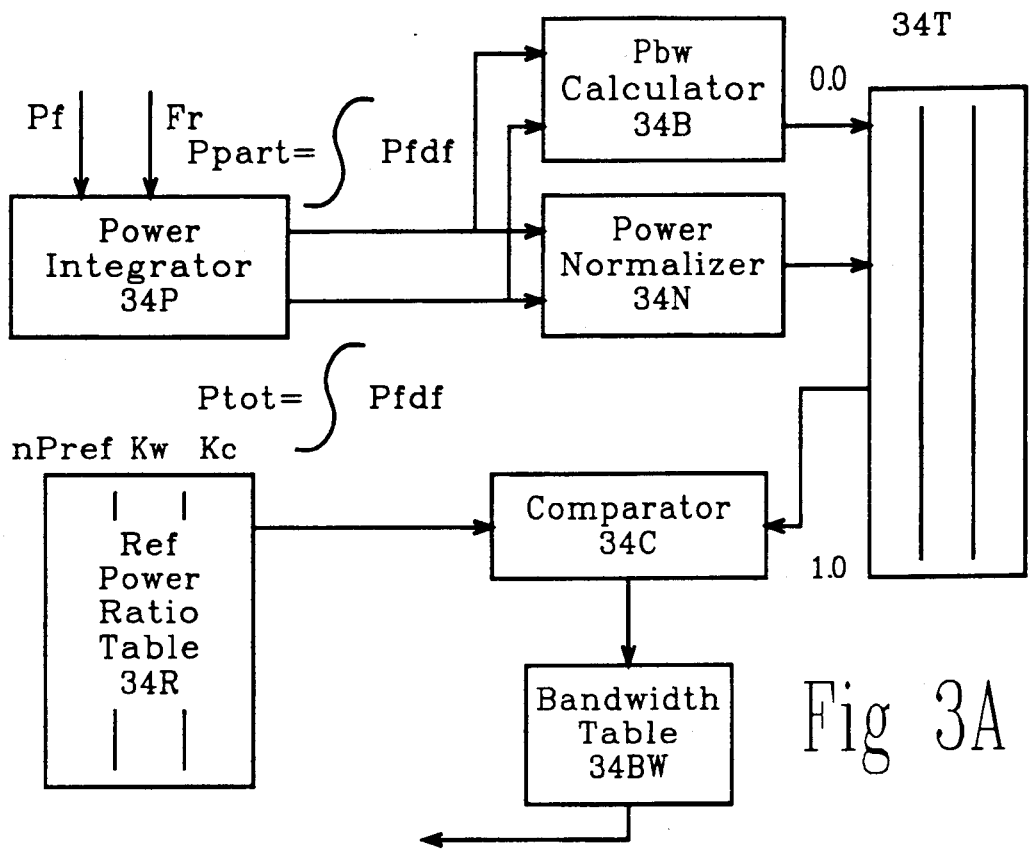
FIG. 3A is a block diagram of the data exclusion controller of FIG. 2.

Line width calculator 25W calculates the test symbol line width LW along the current retrieval pass at the initial power level (and subsequent levels) in accordance with the relationship:

$$LW = BW \times Kw$$

in which
- LW is the calculated line width of the test symbol along the current pass (the average width of all symbol areas traversed during the current retrieval pass across the character cell), and
- BW is the bandwidth of the power spectrum Fi down to F1 remaining after each cycle of the exclusion sequence eliminating the upper frequencies Fmax down to Fi (see FIG. 3B), and
- Kw is a constant for each power level obtained from the power exclusion controller (see FIG. 3A).

The line width of the symbol is the largest feature within the cell bit map and is therefore confined to the lower frequency portion of the spectral response. The calculated LW is entered into the first location of line feature entry table 26F.

Line count calculator 25C calculates the test symbol line count LC along the current retrieval pass for the initial power level in accordance with the relationship:

$$LC = Pbw \times Kc / Lw$$

in which
- LC is the calculated line count of the test symbol along the current pass (an estimate of the number of symbol areas traversed during the current retrieval pass across the character cell), and
- Pbw is the power remaining within the bandwidth BW of the power spectrum Fi down to F1 after each cycle of the exclusion sequence eliminating the upper frequencies Fmax down to Fi (see FIG. 3B), and
- Kc is a constant for each power exclusion level obtained from the power exclusion controller (see FIG. 3A).

LCs are typically five or less and also confined to the lower frequency portion of the spectral response. The calculated LC is entered into the first location of table 26F along with the calculated LW.

The level of the power spectrum is further reduced by a predetermined power increment. An LW and LC are calculated for the reduced level and entered into the second location of the line feature entry table. The power is reduced by another increment and entered into the third location. The data exclusion entries are generated by progressively excluding a small power increment with progressive loss of high frequencies in the power spectral data. The power exclusion sequence is terminated at an optimum final power level and the last entry is entered into the last location.

Line width merger 26W merges all of the LWs in table 26F into a single line width for the current retrieval pass by determining the mean line width (LWm). The mean value of the line width is a decimal number forming a composite of all of the LWs generated by the power exclusion sequence for the current retrieval pass.

Similarly, line count merger 26C merges all of the LCs in table 26F to determine the mean line count (LCm). The mean value of the line count is rounded off to the nearest whole integer by round-off device 26R to provide "LCr".

Confidence factor generator 26CF receives "LCm" for the current retrieval pass from LC merger 26C and the LC exclusion entries from table 26F, and generates the standard deviation (SD) and the confidence factor (CF) of the exclusion entries. The standard deviation for the current retrieval pass is the square root of the sum of the squares of the individual deviations from the LCm value defined by the relationship:

$$\text{Standard Deviation} = \sqrt{1stDev^2 + 2ndDev^2 \ldots + NthDev^2}$$

The confidence factor "CF" for the current retrieval pass is defined by the relationship:

$$CF = (LCm - SD)/LCm,$$

and indicates the reliability of the line feature information. The LWm and LCr and CF resulting from the retrieval passes of each of the R rows and C columns of the test symbol, are entered into a composite table for further processing through a match device and character library.

POWER EXCLUSION CONTROLLER 24—(FIG. 3 ABC)

Power exclusion controller 24 receives frequency Fr and power Pf data from power memory table 23M, and provides a bandwidth BW, and a bandwidth power Pbw, and Kw and Kc coefficients from bandwidth table 34BW for each retrieval pass. The bandwidth data and coefficients are used in LW calculator 25W and LC calculator 25C.

Power integrator 34P within controller 24 provides the total integral "Ptot" of Pf with respect to frequency over the entire power frequency spectrum (Fmax down to F1):

$$Ptot = \int_{Fmax}^{F1} (Pf) df$$

in which
- Pf is the power at a given frequency,
- Fmax is the highest frequency in the entire power spectrum, and
- F1 is the lowest frequency in the entire power spectrum.

Total power Ptot is the total area under the power spectrum response curve (see FIG. 3B-bold curve) across the entire spectrum Fmax to F1.

The integrator also provides a series of partial of indefinite integrals "Ppart" of Pf with respect to frequency over the range of excluded upper frequencies (Fmax down to Fi):

$$Ppart = \int_{Fmax}^{Fi} (Pf) df$$

in which
- Pf is the power at a given frequency,
- Fmax is the highest frequency in the partial power spectrum, and
- Fi is the lowest frequency in the partial power spectrum which defines the portion of the upper frequencies to be excluded.

Partial power Ppart is the partial area under the power spectrum response curve (see FIG. 3B) across the upper portion of the spectrum Fmax to Fi.

Pbw calculator 34B within controller 24 calculates the power Pbw remaining in the non-excluded bandwidth portion of the spectral response after each exclusion cycle in accordance with the relationship:

Pbw = Ptot-Ppart.

Each Pbw is stored in a test power memory table 34T along with the associated bandwidth BW (frequency Fi down to (F1).

Normalizer 34N within controller 24 divides each of the Ppart integrals by the total Ptot integral to provide normalized excluded power integral "nPpart" in accordance with the relationship:

nPpart = Ppart/Ptot

The normalized power nPpart is a unitless number between 0 and 1, stored in test power table 34T along with the associated Pbw and BW. The nPpart numbers in memory 34T are test power ratios for each frequency of the current retrieval pass of the test symbol.

Figure 3B:
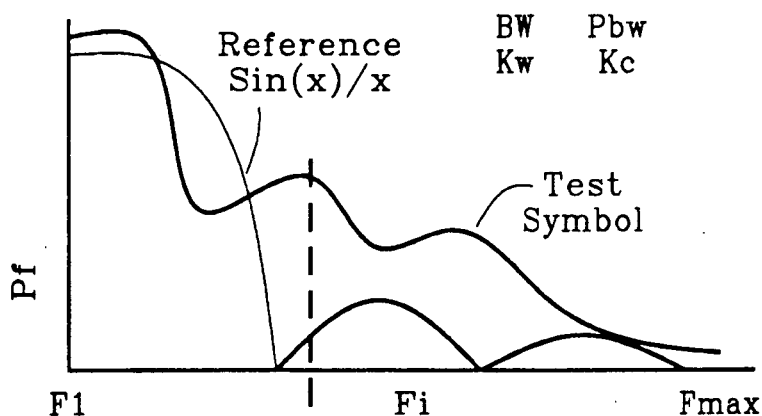
FIG. 3B is a graph of power "Pf" at each frequency of the power spectrum verses frequency "Fr" of a typical input test symbol.
Figure 3C:
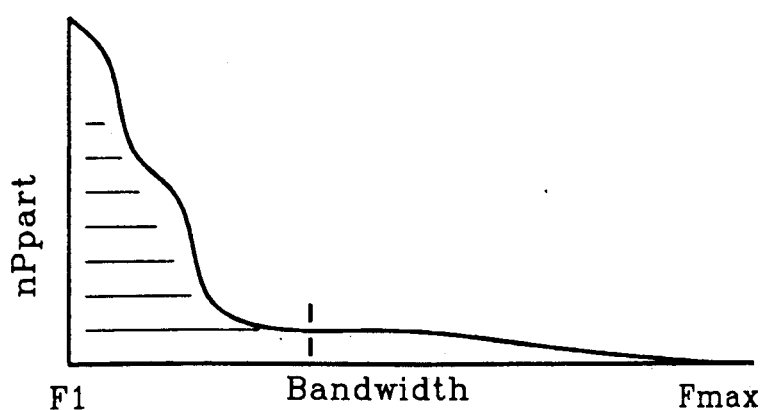
FIG. 3C is a graph of normalized partial power "nPpart" of the excluded upper portion of the power spectrum verses the "BW" of the included portion of the power spectrum of FIG. 3B. The elements of the invention are designated by two digit reference numerals. The first digit indicates the Figure in which that element is first disclosed or is primarily described. The second digit indicates like features and structures throughout the Figures. Some reference numerals are followed by a letter which indicates a sub-portion or feature of that element.

Reference power ratio table 34R within controller 24 contains a set of predetermined power ratios "nPref" and associated Kw and Kc coefficients for a suitable ideal reference such as the power spectrum of a single line reference symbol - the function Sin(x)/x (see FIG. 3B light curve). The reference power ratios correspond to predetermined power exclusion levels of the reference symbol.

Comparator 34C within controller 24 receives the lowest nPref ratio from table 34R for comparison to the lowest nPpart ratios from test table 34T starting with Fmax. When a compare occurs, comparator 34C pairs the bandwidth BW and bandwidth power Pbw of the nPpart with the coefficients Kw and Kc of the nPref for storage in bandwidth table 34BW for use in line width calculator 25W and line count calculator 25C.

SPECIFIC EMBODIMENT

The following particulars of symbol analyzing are given as an illustrative example of data exclusion sequence. In this example:

The digitizer has 400 photodiodes per inch formed in a printed circuit.

The number of rows R in the character cell is 50 and the number or columns C is 100.

The number of frequencies F in the Fourier transform is 64 for row passes (32 non-redundant frequencies) and 128 for column passes (64 non-redundant frequencies).

Greyscale data GS is 256 bits.

The initial optimum power level Pbw at the start of the exclusion sequence is about a 90% of the total power Ptot. The initial excluded power Ppart is about 10% of Ptot. The initial Fi is about 10. The exclusion sequence includes eight incremental cycles each of which excludes about 5% of Ptot from the Pbw. The final optimum power of Pbw is about 50% of the Ptot. The final Fi is about 5.

The values given above are not intended as defining the limitations of the invention. Numerous other applications and configurations are possible.

CONCLUSION

It will be apparent to those skilled in the art that the objects of this invention have been achieved as described hereinbefore by providing an improved symbol analyzing system for deriving line width and line count feature information about the input symbols.

Clearly various changes may be made in the structure and embodiments shown herein without departing from the concept of the invention. Further, features of the embodiments shown in the various Figures may be employed with the embodiments of the other Figures. Therefore, the scope of the invention is to be determined by the terminology of the following claims and the legal equivalents thereof.

I claim as my invention;

1. A symbol analysis system which receives and processes symbol data from symbols for deriving feature information concerning the symbols represented by the symbol data, and for generating a confidence factor indicating the reliability of the derived symbol feature information, by progressively reducing the bandwidth of the processed symbol data, comprising:
    digitizer means for receiving an input document containing the symbol data and providing an input bit stream;
    document memory means for receiving and storing the input bit stream in a bit map of the input document;
    retrieval means for identifying symbol bit maps within the document bit map and systematically addressing selected symbol bit maps along retrieval passes to provide bit streams of symbol data;
    spectral transform means for transforming the bit streams of symbol data into a spectral response having a lower frequency end and an upper frequency end;
    data exclusion means for receiving the spectral response and providing a set of symbol feature information entries based on progressively reducing the bandwidth of the spectral response by excluding a progressively larger portion of the upper frequency end; and
    processor means for receiving the set of symbol feature information entries and forming a single composite entry for the symbol feature information with a confidence factor indicating the reliability of the composite entry.

2. Symbol analysis system of claim 1 wherein the spectral transform means is a Fourier transform means for providing a Fourier spectral response.

3. Symbol analysis system of claim 2 further comprising, a power conversion means for converting the Fourier spectral response from the Fourier transform means into a power spectral response.

4. Symbol analysis system of claim 2 wherein the Fourier spectral response extends from a maximum frequency Fmax at the upper end of the spectral response to a fundamental frequency F1 at the lower end of the spectral response.

5. Symbol analysis system of claim 1 wherein the digitizer means provides greyscale data within the symbol data which is included in the spectral response from the spectral transform means.

6. Symbol analysis system of claim 1 wherein the symbol feature information derived by the system is line width information.

7. Symbol analysis system of claim 1 wherein the symbol feature information derived by the system is line count information.

8. Symbol analysis system of claim 1 wherein the symbol feature information derived by the system is line width and line count information.

9. Symbol analysis system of claim 1 further comprising, a feature information entry table means for receiving and storing the set of symbol feature information entries from the data exclusion means.

10. Symbol analysis system of claim 1 further comprising, a symbol bit map memory means for receiving the symbol data for symbols selected from the document memory means.

11. Symbol analysis system of claim 10 wherein the symbol data in the symbol bit map memory means is arranged by rows of bits and columns of bits.

12. Symbol analysis system of claim 11 wherein the retrieval passes along the symbol bit maps are along the rows and/or columns of the symbol bit map.

13. Symbol analysis system of claim 12 wherein the retrieval passes along the rows of bits in the symbol bit map generally correspond to horizontal passes across the symbol, and the retrieval passes along the columns of bits in the symbol bit map generally correspond to vertical passes across the symbol.

14. A symbol analysis system which receives and processes power spectral data of input symbols for deriving line feature information concerning the input symbols and which generates a confidence factor indicating the reliability of the derived line feature information, comprising:
    power exclusion means which receives the power spectral data and provides a set of line feature information by progressively reducing the power level of the power spectral data by excluding a progressively larger portion of the upper frequencies of the power spectral data;
    line width calculator means responsive to the set of line feature information for calculating a corresponding set of line width LW entries;
    line width merge means for merging the set of LW entries into a single merged line width LWm;
    line count calculator means responsive to the set of line feature information and to the set of LW entries for calculating a corresponding set of line count LC entries;
    line count merge means for merging the set of LC entries into a single merged line count LCm; and
    confidence factor generator means responsive to the line count calculator means for generating the confidence factor.

15. Symbol analysis system of claim 14, wherein the merged line width LWm is the mean value of the set of line width LW entries.

16. Symbol analysis system of claim 14, wherein the merged line count LCm is the mean value of the set of line count LC entries.

17. Symbol analysis system of claim 16, further comprising line count round off means for rounding off the LCm to the nearest whole integer to provide a rounded off line count LCr.

18. Symbol analysis system of claim 16, wherein the confidence factor generator means is responsive to the set of LC entries from the LC calculator means and to the LCm from the LC merge means for generating a confidence factor CF.

19. Symbol analysis system of claim 18, wherein the confidence factor generator means generates the CF in accordance with the relationship:

$$CF = (LCm - SD)/LCm$$

in which

SD is the standard deviation between the LCs in the set of line count entries LC and the mean line count LCm.

20. Symbol analysis system of claim 18 further comprising, a line feature information table means for receiving and storing the set of LW and LC entries.

21. Symbol analysis system of claim 14, wherein the power spectral data of the input symbols includes greyscale data.

22. Symbol analysis system of claim 14, wherein the power spectral data is a power level Pf at each frequency Fr within the spectrum of power frequencies.

23. Symbol analysis system of claim 22, wherein the spectrum of power frequencies extends from a maximum frequency Fmax down to a fundamental frequency F1.

24. Symbol analysis system of claim 23, wherein the power exclusion means further comprises an integrator means for providing the integral of power with respect to frequency.

25. Symbol analysis system of claim 24, wherein the integrator means provides the integral total of power Ptot over the entire spectrum of power frequencies in accordance with the relationship:

$$Ptot = \int_{Fmax}^{F1} (Pf)df$$

in which

Pf is the power at a given frequency,
Fmax is the highest frequency in the entire power spectrum, and
F1 is the lowest frequency in the entire power spectrum.

26. Symbol analysis system of claim 25, wherein the integrator means also provides the integral of partial power Ppart over the upper part of the frequency spectrum to be excluded in accordance with the relationship:

$$Ppart = \int_{Fmax}^{F1} (Pf)df$$

in which

Pf is the power at a given frequency,
Fmax is the highest frequency in the partial power spectrum, and
Fi is the lowest frequency in the partial power spectrum which defines the portion of the upper frequencies to be excluded.

27. Symbol analysis system of claim 26, wherein the power exclusion means further comprises a bandwidth power calculator means for providing the bandwidth power Pbw of the lower portion of the power spectral data to be included in the series of line information in accordance with the relationship:

$$Pbw = Ptot - Ppart.$$

28. Symbol analysis system of claim 27, wherein the power exclusion means further comprises a normalizer means for providing a normalized power ratio nPpart in accordance with the relationship:

$$nPpart = Ppart/Ptot.$$

29. Symbol analysis system of claim 28 further comprising, a test table means for receiving and storing the series of Pbws from the bandwidth power calculator means and the series of nPparts from the normalizer means.

30. Symbol analysis system of claim 28 further comprising a reference table means for storing a set of predetermined reference normalized power ratios nPref from a predetermined reference symbol.

31. Symbol analysis system of claim 30 wherein the predetermined reference symbol is an ideal symbol having a predetermined line width and line count.

32. Symbol analysis system of claim 30 wherein the predetermined reference symbol is an ideal symbol having a predetermined line width and a line count of one and is represented by the relationship Sin(X) / X.

33. Symbol analysis system of claim 30 wherein the reference table means further stores a set of line width coefficients Kw and a set of line count coefficients Kc, one for each nPref ratio.

34. Symbol analysis system of claim 33 further comprising a comparing means for comparing the nPpart ratios from the test table means starting with the lowest with the nPref ratios from the reference table means starting with lowest to match Kw and Kc coefficients with BWs and Pbws.

35. Symbol analysis system of claim 34 wherein the line width calculator means provides a calculated line width in accordance with the relationship $$LW = BW \times Kw$$

in which
BW is the bandwidths of the spectrum of power frequencies from the test table means, and
Kw is a line width coefficient from the reference table means.

36. Symbol analysis system of claim 35 wherein the line count calculator means provides a calculated line count in accordance with the relationship $$LC = Pbw \times Kc / LW$$

in which
Pbw is a bandwidth power from the test table means, and
Kc is a line count coefficient from the reference table means.

37. Symbol analysis system of claim 34 further comprising a bandwidth table means for storing a set of coefficients from the reference table means and the matched BWs and Pbws from the test table means.

38. A method of processing the power spectrum of an input symbol for deriving line feature information concerning the input symbol and generating confidence factors indicating the reliability of the derived line feature information, comprising the steps of:
providing the power spectrum for data retrieval passes across the input symbol;
integrating the power within the power spectrum with respect to frequency to provide of the total power Ptot over the entire power spectrum of power frequencies in accordance with the relationship:

$$Ptot = \int_{Fmax}^{F1} (Pf) df$$

in which
Pf is the power at a given frequency,
Fmax is the highest frequency in the power spectrum, and
F1 is the lowest frequency in the entire power spectrum;
progressively reducing the power spectrum by excluding a progressively larger portion of the upper frequencies thereof;
integrating the progressively larger excluded portion of the power spectrum with respect to frequency to provide a series of partial power integrals Ppart over the upper part of the frequency spectrum in accordance with the relationship:

$$Ppart = \int_{Fmax}^{F1} (Pf) df$$

in which
Pf is the power at a given frequency,
Fmax is the highest frequency in the power spectrum, and
Fi is the lowest frequency in the partial power spectrum which defines the portion of the upper frequencies to be excluded;
subtracting each of the excluded Ppart from the Ptot to provide a series of bandwidth powers Pbw for a series bandwidths of the lower portion of the power spectrum to be included in deriving the line information;
providing a set of predetermined reference powers and reference coefficients from a predetermined reference symbol; and
comparing the excluded Ppart powers starting with the lowest with the reference powers starting with lowest to match the set of reference coefficients with a corresponding set of included Pbws and bandwidths for each retrieval pass.

39. The method of claim 38 further comprising the step of dividing each of the excluded Ppart by the Ptot to provide a series of normalized power ratios nPpart for comparison with a set of normalized reference power ratios.

40. The method of claim 38 in which the step of progressively reducing the power level further comprises an initial step of establishing an optimum initial level by eliminating the highest frequencies of the high frequency portion of the power spectrum.

41. The method of claim 38 wherein the reference coefficients are line width coefficients and line count coefficients.

42. The method of claim 41 further comprising the step of calculating a line width LW and a line count LC in accordance with the relationships:

$$LW = BW \times Kw$$

$$LC = Pbw \times Kc / LW$$

in which
BW is a bandwidth from a test table means, and
Kw is a line width coefficient from a reference table means
Pbw is a bandwidth power from the test table means, and
Kc is a line count coefficient from the reference table means.

* * * * *